US008954779B2

(12) United States Patent
Boehl

(10) Patent No.: US 8,954,779 B2
(45) Date of Patent: Feb. 10, 2015

(54) METHOD FOR CHECKING SIGNAL AND MODULE ACTIVITIES IN A TIMER MODULE AND TIMER MODULE

(75) Inventor: Eberhard Boehl, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 276 days.

(21) Appl. No.: 13/637,137

(22) PCT Filed: Mar. 16, 2011

(86) PCT No.: PCT/EP2011/053962
§ 371 (c)(1),
(2), (4) Date: Dec. 3, 2012

(87) PCT Pub. No.: WO2011/120802
PCT Pub. Date: Oct. 6, 2011

(65) Prior Publication Data
US 2013/0073891 A1    Mar. 21, 2013

(30) Foreign Application Priority Data

Mar. 31, 2010    (DE) .......................... 10 2010 003 538

(51) Int. Cl.
*G06F 1/14*     (2006.01)
*G06F 11/07*    (2006.01)
*G06F 11/30*    (2006.01)

(52) U.S. Cl.
CPC ........ *G06F 11/0739* (2013.01); *G06F 11/0757* (2013.01); *G06F 11/3013* (2013.01); *G06F 11/3055* (2013.01)
USPC .......................................... 713/502; 713/500

(58) Field of Classification Search
CPC ................. G06F 11/00; G06F 11/30
USPC .................................................. 713/500, 502
See application file for complete search history.

(56) References Cited

U.S. PATENT DOCUMENTS

| 5,218,693 | A  | * | 6/1993  | Ogita ............................. 713/502 |
| 5,233,613 | A  | * | 8/1993  | Allen et al. ...................... 714/55 |
| 5,319,785 | A  |   | 6/1994  | Thaller |
| 5,617,433 | A  |   | 4/1997  | Suzuki |
| 5,631,592 | A  | * | 5/1997  | Schwarz et al. ............... 327/172 |
| 7,536,580 | B2 | * | 5/2009  | Miyazaki ....................... 713/502 |
| 2005/0262372 | A1 | * | 11/2005 | Saitoh ........................... 713/400 |
| 2007/0050123 | A1 | * | 3/2007  | Nishimura ..................... 701/103 |
| 2012/0155603 | A1 | * | 6/2012  | Mackenna et al. .............. 377/27 |

FOREIGN PATENT DOCUMENTS

CN       1813437       8/2006
EP       0 676 696     10/1995

OTHER PUBLICATIONS

Patterson, D.A., et al., "Computer Organization & Design—The Hardware/Software Interface", 1994, Morgan Kaufmann Publishers, pp. 565-570.
International Search Report for PCT/EP2011/053962, dated Jul. 18, 2011.

\* cited by examiner

*Primary Examiner* — Vincent Tran
(74) *Attorney, Agent, or Firm* — Kenyon & Kenyon LLP

(57) ABSTRACT

A timer module having a status register is connectable to an external arithmetic unit and generates at least one activity signal for an internal signal of the timer module and/or an internal unit of the timer module and/or a process within the internal unit, and enters an activity status into a status register in the event of a determined activity, and allows the activity status to be polled and reset by the external arithmetic unit at times determined by the external arithmetic unit. Furthermore, the activity status entered into the status register remains until it is reset by the external arithmetic unit.

5 Claims, 3 Drawing Sheets

METHOD FOR CHECKING SIGNAL AND MODULE ACTIVITIES IN A TIMER MODULE AND TIMER MODULE

BACKGROUND OF THE INVENTION

1. Field of the Invention

The present invention relates to a method for checking signal and module activities in a timer module and a timer module.

2. Description of the Related Art

According to the related art, such checks have not yet been used in timer modules, in particular in control units in the automotive field, although they allow for a significantly higher degree of safety. It is, in contrast, customary to check the output signals of timer units for correctness. Moreover, the possibility is known of monitoring by a CPU the activity of this CPU via regular pollings of an external watchdog.

BRIEF SUMMARY OF THE INVENTION

The present invention provides a timer module, in particular a timer module of a control unit, which meets higher safety standards since not only signal outputs of the timer unit are checked for faultiness and activity, but also internal signals and units of the timer module may be checked for activity with the aid of pollings by an associated external arithmetic unit or CPU. In addition to the hardware for a watchdog having counters for different signals and an additional time base for the watchdog, the configuration of different timeout values for different signals in the watchdog may also be dispensed with since the pollings are performed by the external arithmetic unit at the points in time determined by the external arithmetic unit. This means that times do not have to be configured in the timer module to adapt the duration between two pollings to the changing conditions.

It is particularly advantageous to monitor a timer module-internal clock signal or the corresponding clock generator unit and/or a timer module-internal routing unit for activity, since the inactivity of these units or signals limits the function of the timer module to a particularly great extent, which is why a fastest and most reliable detection of this inactivity, e.g., a check directly after the start, is desirable.

In one advantageous embodiment it may also be provided that, in addition to the activity status identifications (signal/ unit active), error status identifications (generated signal erroneous) are also provided in the status register, since the joint evaluation of this information by the arithmetic unit makes a particularly reliable detection of a correct mode of operation possible. A non-existent error identification indicates that either the signal accordingly identified therewith is error-free, or that no error check could be carried out for the signal due to inactivity of the signal or due to inactivity of signals or units necessary for the signal check. Now, if the activity of the corresponding signals and units has been determined by the activity identifications in the status register, the signal may be assumed to be error-free with a higher degree of certainty.

DETAILED DESCRIPTION OF THE INVENTION

A timer module of a control unit may preferably be implemented as an IP block in the microcontroller of a control unit, e.g., of a vehicle control unit. It combines the time and, if applicable, the trigonometric function, receives signals from the sensor system of the vehicle (e.g., yaw-rate sensor of an ESP), and evaluates them, and acts on the actuators of the car (e.g., on the vehicle dynamics in the "skidding" event). Alternatively, it would also be possible to integrate such a timer, as described in the following, into an output stage or provide it separately; however, it always needs a configurating unit (e.g., external arithmetic unit). In the case of its integration into the control unit microcontroller, this unit could be the or a control unit CPU (or arithmetic unit), for example.

Figure 1:
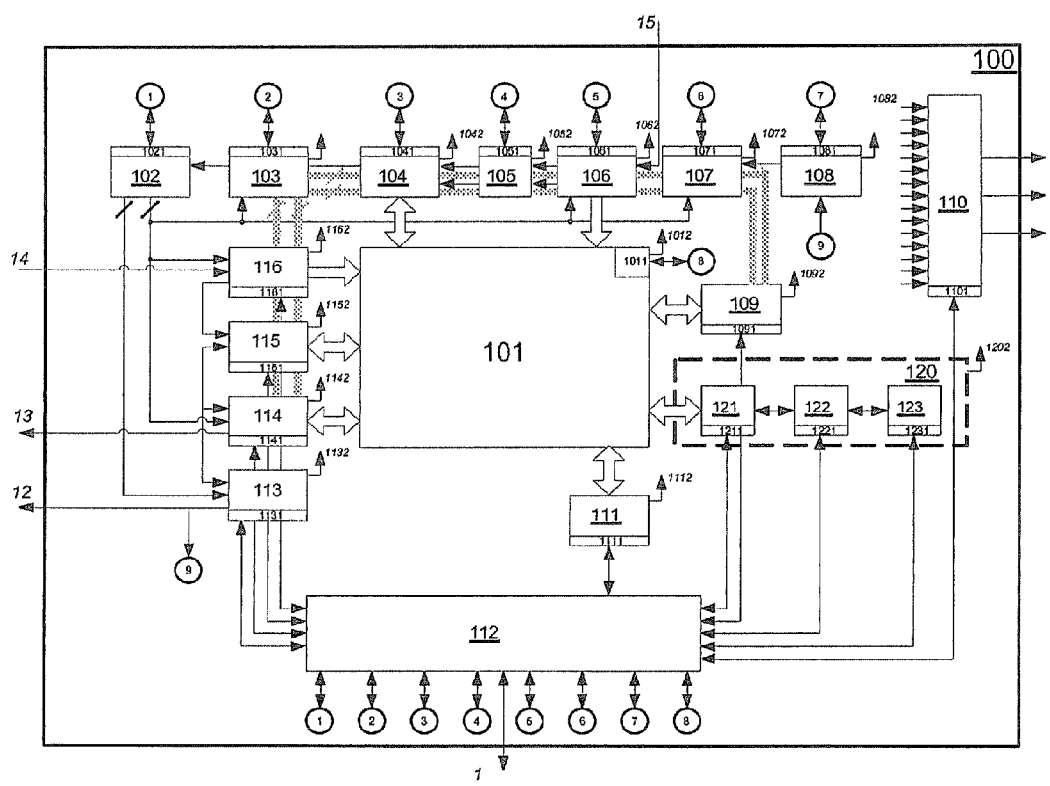
FIG. 1 shows a schematic illustration of a timer module.

FIG. 1 shows the overall configuration of an exemplary timer module 100. In simplified terms, the overall configuration of the timer module has a signal input unit (signal input units) 116 which outputs values to a routing unit 101; these values are processed in other modules and the processed values are forwarded to output unit 114 via routing unit 101. A large number of requests may be managed within a short period of time in that the modules described in the following work in parallel. If certain modules are not needed, they may be turned off for power saving purposes (power consumption, temperature reduction).

The core of timer module 100 is central routing unit 101 to which input (e.g., module(s) 116), output (e.g., module(s) 114), processing (e.g., module 109), and memory units (e.g., module 120) are connected.

Routing unit 101 interconnects the modules flexibly and configurably and represents, due to the blocking requesting and transmitting of data, a new interrupt concept for a timer module. It can be installed without the implementation of an interrupt controller, resulting in space and thus chip cost savings. A central concept of timer unit 100 is the routing mechanism of routing unit 101 for data streams. Each module (or submodule) of timer module 100, which is connected to routing unit 101, may have any number of routing unit write channels (data sources) and any number of routing unit read channels (data sinks). The concept of routing unit 101 provides that any data source may be connected flexibly and efficiently to any data sink. This may be implemented using a data routing mechanism.

Parameter memory module 120 includes three subunits 121, 122, and 123. Subunit 121 represents the interface between FIFO (first in, first out) memory 122 and routing unit 101. Subunit 123 represents the data interface between the generic bus interfaces of the modules, or multiplex device 112 (see below), and FIFO 122. Parameter memory module 120 may be used as a data memory for incoming data characteristics or as a parameter memory for outgoing data. The data are stored in a memory, e.g., RAM, which is logically situated in FIFO subunit 122.

Timer input module 116 (preferably including multiple inputs) is responsible for filtering and receiving input signals of timer module 100. Different characteristics of the input signals may be measured within the channels of timer input module 116. For this purpose, the signals are linked to time information and other physical information in timer input module 116 and are used, after being processed and, if necessary, buffered, in output unit 114 to generate output signals. The physical information is, for example, the angle of an engine or also any other physical variable such as mass, temperature, level of a fluid, phase of an oscillation, a number of events (edges), or the period duration of a signal. Input characteristics may, for example, include the time stamp values of detected rising or falling input flanks combined with the new signal level or the number of the flanks since a channel release combined with the instantaneous time stamp or PWM signal lengths for an entire PWM period. The values which are assigned to an input signal, such as the value of the time base and the value of the angle base at the point in time of the input event, thus characterize the input signal and allow for calculations in other modules which are connected to routing unit 101 (e.g., module 109), and may then contact an output unit (output unit 114) in which output signals are generated as a function of the transmitted values in connection with the instantaneous time and/or angle base values.

For advanced data processing, the detected input characteristics of timer input module 116 may be routed to the other processing units of timer module 100 by routing unit 101.

The unit for clock pulse conditioning 102 is responsible for the clock pulse generation of the counters and of timer module 100. It makes available configurable clock pulses, and time base unit 103 having both time- and position-related counters provides a common time base for timer module 100, i.e., makes available instantaneous time and position information (e.g., angle).

The individual modules are supplied with clock pulses and time bases and exchange data via routing unit 101. With the aid of comparators locally present in the individual modules, the data are compared against the instantaneous time and/or position, and decisions made in the process are signaled, such as the switching of an output signal.

When the data are routed with the aid of routing unit 101, branching unit 111 makes the data of a source also available to multiple data sinks in one or different modules, since a blocking reading of the data is usually provided which permits only one-time reading of a piece of data from a source. Since every write address for the submodule channels of timer module 100, which are able to write to routing unit 101, may only be read by one single module, it is impossible to make a data stream available to different modules in parallel. This does not apply to sources which do not invalidate their data after the data was read by a receiver, as may be provided for DPLL module 104, for example. To solve this problem for regular modules, it allows branching unit 111 to duplicate the data streams multiple times. This submodule 111 makes input and output channels available. In order to clone an incoming data stream, the appropriate input channel may be mapped on one or more output channels.

DPLL (digital phase-locked loop) module 104 is used for frequency multiplication. Due to this module 104, it is possible to achieve greater accuracy of the position or the value information even in the case of applications having rapidly changing input frequencies. DPLL module 104 generates from position-related input signals impulses which allow a more detailed subdivision of the position information in time base unit 103. In this way, a meter may, for example, indicate a higher resolution of a rotation angle than is predefined by the input signals. Moreover, information regarding speed or rotational speed is available in DPLL module 104, and it is possible to make predictions as to when a predefined position will be reached, also taking into consideration a course over time (e.g., taking into consideration the inertia of the control module). The input signals for DPLL module 104 are guided via timer input module 106, filtered in an input mapping module 105, or are else combined in a sensor pattern evaluation module 115, e.g., in particular for the evaluation of electric motors.

Timer input module 106 is special compared to other timer input modules 116 in that it forwards the instantaneous filtering values, using which it filters the input signals, to input signal mapping module 105 and DPLL module 104 and that the filtering values are added to the time stamps of the filtered edge to obtain an actual edge time.

Sensor pattern evaluation module 115 may be used to evaluate the inputs of multiple Hall sensors and to assist, together with timer output module 113 (preferably including multiple outputs), the operation of brushless direct current machines. Additionally, sensor pattern evaluation module 115 may also be used, for example, to calculate the rotational speed of one or two electric machine(s).

With the aid of output comparison unit 108, output signals may be compared to one another bit by bit. It is devised for use in safety-relevant applications. The main idea here is to have the possibility of doubling the outputs to be able to compare them in this unit. If, for example, a simple EXOR (exclusive OR) function is used for this purpose, it might be necessary to secure the output characteristic of an entire cycle of the output modules to be compared. As shown in FIG. 1, output comparison unit 108 is connected to the connection between timer output module 113 and pin 12 via the connection indicated by reference numeral 9.

Monitor unit 107 is also devised for use in safety-relevant applications. The main idea here is to provide the possibility of monitoring jointly used circuits and resources. In this way, the activity of the clocks and the basic activity of routing unit 101 are monitored. Monitor unit 107 makes it possible for an external CPU (central processing unit) or an external arithmetic unit in general to monitor central signals for safety-critical applications in a simple manner.

In FIG. 1, the interrupt request lines of the modules are labeled with four-digit reference numerals having the ending "2" and the first three numerals are labeled corresponding to the module. Interrupt concentration module 110 is used to appropriately bundle interrupt request lines XXX2 of the individual submodules in interrupt groups and to then forward them to the external arithmetic unit.

All modules are configurable by an arithmetic unit via a bus interface (universal handshaking interface). Data are also exchangeable via this bus interface. This is used to configure the outputs for periodic sequences, for example, for the output module timer output module 113 which is not connected to the routing unit. Timer output module 113 offers independent channels to generate PWM (pulse width modulated) signals at each output pin, for example. Additionally, a pulse timer-modulated signal may be generated at an output of timer output module 113.

Timer output module 114 which is connected to routing unit 101 is capable of generating complex output signals without CPU interaction due to its connection to routing unit 101. Typically, output signal characteristics are made available via the connection to routing unit 101 by submodules connected to routing unit 101, such as DPLL submodule 104, multi-channel sequencer module 109, or parameter memory module 120.

Multi-channel sequencer module 109 is a generic data processing module which is connected to routing unit 101. One of its main applications is to calculate complex output sequences which may depend on the time base values of time base unit 103 and which are processed in combination with module 114. Each submodule of time output module 114 which is connected to routing unit 101 includes output channels which are able to operate independently from one another in different configurable operating modes.

In FIG. 1, the microcontroller bus is labeled with reference numeral 11, and the different pins (or pin groups) are labeled with reference numerals 12 through 15.

The timer module is equipped with a generic bus interface which is adaptable in various ways to different SoC buses (SoC=system on a chip). The adaptation of the generic bus interface is typically achieved via a bridge module which translates the signals of the generic bus interface into the signals of the particular SoC bus. In FIG. 1, the generic bus interfaces of the modules are labeled with four-digit reference numerals having the ending "1" and the first three numerals are labeled corresponding to the module. Multiplex device 112 multiplexes the generic bus interfaces. In FIG. 1, the connections between generic bus interfaces XXX1 and multiplex device 112 are indicated with reference numerals 1 through 8.

Figure 2:
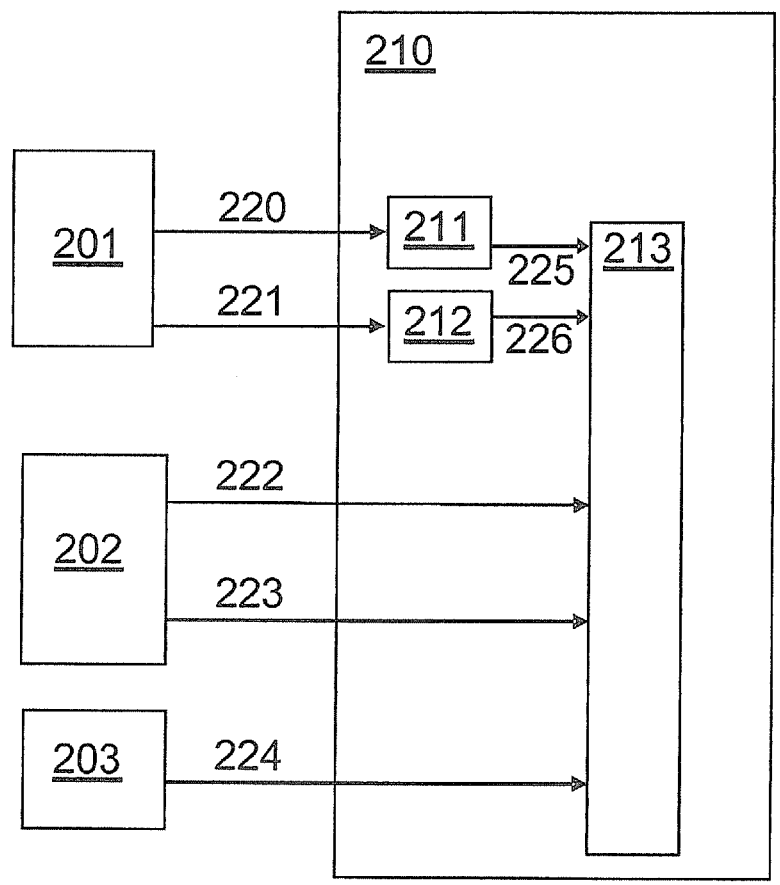
FIG. 2 shows a schematic illustration of a monitor module.

FIG. 2 shows an exemplary embodiment 210 of monitor module 107 from FIG. 1. Monitor module 210 is connected to the unit for clock pulse conditioning 201 (102 in FIG. 1) via connections 220 and 221, to multi-channel sequencer 202 (109 in FIG. 1) via connections 222 and 223, and to output comparison unit 203 via connection 224. The unit for clock pulse conditioning 201 is connected to a first activity checker 211 via connection 220 and to a second activity checker 212 via connection 221. Activity checkers 211 and 212 are connected to status register 213 of monitor module 210 via connections 225 and 226, respectively. Multi-channel sequencer 202 is connected to status register 213 of monitor module 210 via connections 222 and 223 and output comparison unit 203 via connection 224. Here, the connections may each correspond to multiple data lines, depending on the embodiment.

In monitor unit 107, different signal activities of timer module 100 are detected and partially determined.

This means that at least one clock pulse of clock pulse management unit 102 is, for example, checked for the presence of an activity. The activity of the clock signal is checked in monitor unit 210 in the embodiment of FIG. 2. For this purpose, the corresponding clock signal is, for example, guided via connection 220 or connection 221 to activity checkers 211 or 212. They check whether the applied clock signal is active, i.e., in particular whether some type of level change or a certain level change is determinable.

Figure 3:
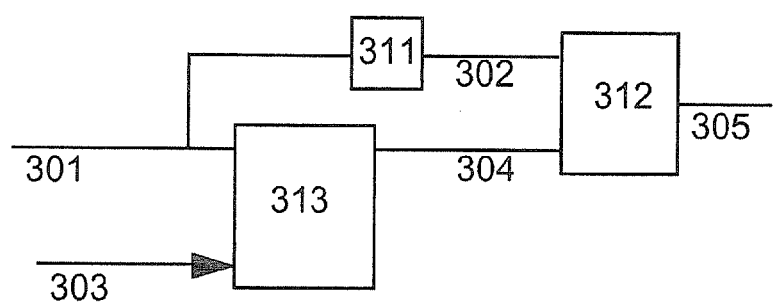
FIG. 3 schematically shows a circuit for an activity check.

A possible design for an activity checker, such as activity checkers 211 and 212 in FIG. 2, is shown in FIG. 3. Here, a signal is transmitted via a connection 301 to inverter (NOT gate) 311 and to delay unit, or flip-flop, 313. The inverted signal is forwarded from inverter 311 via connection 302 to AND gate 312. Delay unit 313 receives a system clock pulse via connection 303 and delays the signal arriving via connection 301, and transmits this signal also to AND gate 312 via connection 304. The result of the ANDing in AND gate 312 is output via connection 305.

The activity checker thus stores a signal to be checked together with the system clock pulse for delay in a memory element (flip-flop 313). Now, if the value of the signal thus delayed deviates at the output of the memory element from the value at the input of the memory element, there is an activity of the relevant signal. Here, it is often not sufficient to determine that some type of activity of the relevant signal was present, but it is important to know, for example, that a certain flank was active. This is checked with the aid of an AND element by an additional inversion of one of the two signals. If, for example, the signal arriving at memory element 313 (connection 301) is at a level "1" but the outgoing delayed signal (connection 304) is at "0" and if the incoming signal is inverted by inverter 311 to "0," no activity is determined, provided that the result "0" of the ANDing corresponds to an inactivity notification. If the inverter would be situated between elements 312 and 313, the discussed signal combination would result in an activity. The configuration of the inversion may thus decide what flank change is registered as signal activity. Another, simpler variant of an activity checker would be the placing of an EXOR gate to which the signal arriving at memory element 313 and the outgoing delayed signal are guided, if the type of a flank change is not important.

The output of activity checker 211 or 212 sets a bit in status register 213 to indicate an activity if it equals "1," for example. As will be explained in greater detail, this bit, which indicates the activity, remains set in the status register until the CPU resets it.

In addition to the example of an activity check of a clock pulse in monitor module 210, the latter may also receive previously determined activity information for signals or units of timer module 100 and store them in status register 213. One example here is the activity signal which was received in FIG. 2 by multi-channel sequencer 202 via connection 222 and stored in status register 213. To be able to check output signals of a timer module 100, the output signal may be guided back again via an input of timer module 100 and checked in multi-channel sequencer 202, for example.

In addition to checking the signal for certain signal characteristics (e.g., signal length, level, period), multi-channel sequencer 202 may also output a signal if a comparison is carried out at all, i.e., regardless of the comparison outcome. In this way, a statement is implicitly made that the units and signals of timer module 100 necessary to carry out the comparison are active. When checking the output signal for its duration, preferably time stamps of time base unit 103 are, for example, used to determine the signal duration, the time stamps being assigned to the output signal levels in input module 116 and sent to multi-channel sequencer 109 or 202 via routing unit 101. The difference between the time stamp values of the start flank and the end flank of the output signal then result in the signal length which may be compared to a predefined comparison value in multi-channel sequencer 202. Regardless of the comparison outcome, an activity signal may, however, be output when carrying out the comparison which, in this example, implicates the activity of routing unit 101, time base unit 103 or the time signal, and of input module 116. Another example of such a comparison is represented by the check of a routing duration of routing unit 101 with the aid of blocking accesses by multi-channel sequencer 202, the assignment of time stamp values and difference formation of the time stamp values. Here, too, the statement "comparison completed" by an activity signal in turn contains information regarding activities, e.g., of the time base and of routing unit 101.

Different comparison methods of this type may be carried out with the aid of multi-channel sequencer 202. For activity signals such as these comparison signals, it would be possible to carry out an ANDing of individual comparison signals, i.e., an activity signal may only be equal to 1 when all individual comparison signals of one group are equal to 1. This, however, only works when all combined comparisons are completed during the same time period and the individual comparison signals are buffered for this purpose. This would mean, however, that the CPU would have to also reset the buffered comparison signals after a positive comparison. Therefore, it is more advantageous to send its own signal for every comparison to the monitor unit.

Monitor unit 107 makes the described information regarding the activity status of signals and units within timer module 100 available to an external processing unit, an external CPU, for example. The CPU may read these activity status values in status register 213 at any time and reset them. The resetting may take place by writing a 1 on the relevant bit in the status register, for example.

The external CPU polls monitor unit 107 in particular at the points in time determined by the CPU. After each polling by the CPU, the active activity status values or the register entries (in particular values in status register 213) may be reset in monitor unit 210 or are reset by the CPU. Conversely, this also means that in the case of an activity, which was registered once during the time period between two CPU pollings, the status bit remains active in status register 213, i.e., indicates the activity even if the activity signal (also) indicates inactivity as a consequence. The activity bit is reset only after the polling by the CPU. The intervals between two pollings of the values in monitor unit 210 by the CPU may be selected by it in such a way that an expected activity must be present during this time period for selected signals. This means that the CPU itself decides after what time period it intends to poll again a certain activity status of a certain signal, for example, since it expects in any case or in all probability an activity within this time period as a function of the prevailing conditions for the certain signal.

If the value confirms an activity, the CPU may reset the status and poll again after another time period. If the value does not report any activity, the CPU may, for example, take measures for further error handling. The CPU may also provide different time intervals for the polling depending on the instantaneous conditions and requirements for different signals and also poll the activity of a certain signal at variable time intervals, since it has the information regarding what comparisons of the multi-channel sequencer must be active in what time period, for example.

For this purpose, no times must be configured in timer module 100, or in monitor module 210, to adapt the duration between two pollings to the changing conditions. The values are each checked by the CPU depending on the necessity; for certain signal activities, it may also be sufficient to check only once at the start (power on). This is in particular the case for those values which do not have a critical direct effect. Moreover, the polling activity of the CPU may also be made a function of the work load of the CPU. The activity of low-frequency clock pulses or comparisons, which take place rarely, may also be checked: The CPU must only select the time window between two pollings to be sufficiently large.

In one particular embodiment of monitor module 210, in addition to activity information, error information may also be stored and also made available to the external processing unit.

For the previously described comparisons in multi-channel sequencer 202 between signal characteristics of output signals and comparison values, it is of course possible to not only generate an activity signal after a completed comparison, but also error signals as a function of the compensation of the comparison. The comparison values for the signal characteristics specify, for example, the upper boundary, the lower boundary, the allowed interval or the exactly applicable values. If these conditions are not met, i.e., a comparison is unsuccessful, an error signal may be output and, for example, written, i.e., marked as an active bit, into status register 213 of monitor unit 210 via connection 223, as shown in FIG. 2. The same applies to an error output in the case of a wrong, in particular too long, routing time of routing unit 101 for a corresponding comparison. When carrying out the previously described comparisons, those comparisons may also be provided which are only designed to determine an activity and not to check an output signal or a routing duration of routing unit 101. For example, it may be checked if the difference between two consecutively obtained time stamps is greater than zero. If this is not the case, the time base has obviously failed, i.e., is inactive. This would, in turn, be indicated by an error output of the comparison.

In the case of multiple comparisons, the same amount of error signals may occur. Alternatively, only one error status entry in status register 213 may be used as the information for multiple comparisons. This error status entry is active when at least one comparison has reported an error, e.g., by the ORing of the error outputs of the different comparisons, by an OR gate, for example. After the CPU has determined an error through the error status entry, it may check in the relevant unit, e.g., multi-channel sequencer 202, what comparison triggered the error and respond accordingly.

Additional information may be obtained by the CPU by combining error signal information and comparison activity signal information. As long as an error signal is not active and the corresponding comparison activity signal of a comparison, however, indicates the completion of the comparison, it is safe to assume that no deviation from the required behavior is present, i.e., the indicated lack of error is not based on the fact that a comparison has not been carried out at all, because the signals or units necessary thereto were inactive.

Figure 4:
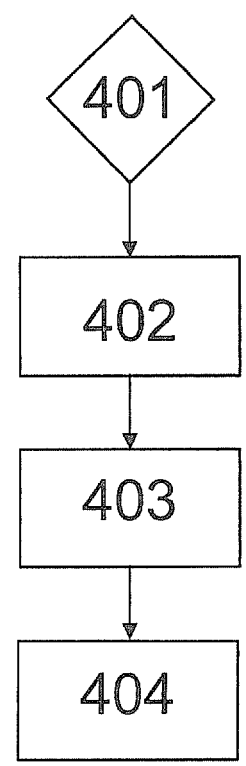
FIG. 4 shows the sequence of a method for checking signal and module activities in a timer module.

In FIG. 4, a method for the activity check in a timer module is shown. In first step 401, an activity signal (active or passive) is generated in a monitor module or is obtained externally. The activity may concern a signal (e.g., a clock signal or an expected output signal of a certain subunit of the timer module), an entire unit (e.g., routing unit 101), or a process of a subunit of the timer (e.g., the activity of a certain comparison process of logic module 109). In second step 402, the activity signal, if active, i.e., if it indicates an activity, is entered as an activity status into a status register in which it remains until it is externally reset. In third step 403, the activity status is polled at a point in time determined by the CPU or after a time period determined by the CPU and is reset in fourth step 404 if active.

What is claimed is:

1. A timer module connectable to an external arithmetic unit, comprising:
   a status register;
   an input, wherein output signals of the timer module are fed back into the input;
   a multi-channel sequence which checks the fed-back output signals for predefined signal characteristics including at least one of a signal length, a signal level, and a signal period;
   means for generating at least one activity signal for a process within the timer module, wherein the activity signal is output by the multi-channel sequencer when the check of the predefined signal characteristics is carried out; and
   means for (i) entering an activity status into a status register in the event of a determined activity, and (ii) allowing the activity status to be polled and reset by the external arithmetic unit at times determined by the external arithmetic unit, wherein the activity status entered into the status register remains until reset by the external arithmetic unit.

2. The timer module as recited in claim 1, further comprising:
   means for storing the at least one activity signal and at least one error status in the status register, wherein the error status (i) identifies a signal erroneously generated in the timer module, (ii) is able to be polled and selectively reset by the external arithmetic unit, and (iii) remains in the status register until reset by the external arithmetic unit.

3. A method for checking the activity of at least one process within an internal unit of a timer module, comprising:

feeding back output signals of the timer module into an input of the timer module;

checking, using a multi-channel sequence, the fed-back output signals for predefined signal characteristics including at least one of a signal length, a signal level, and a signal period;

generating at least one activity signal for a process within the timer module, wherein the activity signal is output by the multi-channel sequencer when the check of the predefined signal characteristics is carried out;

entering an activity status into a status register in the event of a determined activity;

polling the activity status; and resetting the activity status by the external arithmetic unit at times determined by the external arithmetic unit, wherein the activity status entered into the status register remains until reset by the external arithmetic unit.

4. The method as recited in claim 3, further comprising:

storing the at least one activity signal and at least one error status in the status register, wherein the error status (i) identifies a signal erroneously generated in the timer module, (ii) is able to be polled and selectively reset by the external arithmetic unit, and (iii) remains in the status register until reset by the external arithmetic unit.

5. A control unit, comprising:

a timer module connectable to an external arithmetic unit, the time module having:

a status register;

an input, wherein output signals of the timer module are fed back into the input;

a multi-channel sequence which checks the fed-back output signals for predefined signal characteristics including at least one of a signal length, a signal level, and a signal period;

means for generating at least one activity signal for a process within the timer module, wherein the activity signal is output by the multi-channel sequencer when the check of the predefined signal characteristics is carried out;

means for (i) entering an activity status into a status register in the event of a determined activity, and (ii) allowing the activity status to be polled and reset by the external arithmetic unit at times determined by the external arithmetic unit, wherein the activity status entered into the status register remains until reset by the external arithmetic unit; and means for storing the at least one activity signal and at least one error status in the status register, wherein the error status (i) identifies a signal erroneously generated in the timer module, (ii) is able to be polled and selectively reset by the external arithmetic unit, and (iii) remains in the status register until reset by the external arithmetic unit.

\* \* \* \* \*